United States Patent
Zhao et al.

(10) Patent No.: US 9,054,597 B2
(45) Date of Patent: Jun. 9, 2015

(54) BOOST PFC CONTROLLER

(71) Applicant: Silergy Semiconductor Technology (Hangzhou) LTD, Hangzhou, ZheJiang Province (CN)

(72) Inventors: Chen Zhao, Hangzhou (CN); Jie Yao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 222 days.

(21) Appl. No.: 13/760,246

(22) Filed: Feb. 6, 2013

(65) Prior Publication Data

US 2013/0223119 A1 Aug. 29, 2013

(30) Foreign Application Priority Data

Feb. 29, 2012 (CN) .......................... 2012 1 0048426

(51) Int. Cl.
*H02M 7/217* (2006.01)
*H02M 1/42* (2007.01)

(52) U.S. Cl.
CPC ................ *H02M 1/42* (2013.01); *Y02B 70/126* (2013.01); *H02M 1/4225* (2013.01)

(58) Field of Classification Search
CPC ..................... H02M 3/33507; H02M 3/33523; H02M 3/158; G05F 1/10; G05F 1/70; Y02B 70/126

USPC ........ 323/207, 224, 282–290; 363/17, 39–48, 363/79–81
See application file for complete search history.

(56) References Cited

U.S. PATENT DOCUMENTS

| 4,940,929 | A  | * | 7/1990 | Williams ...................... 323/222 |
| 6,469,917 | B1 | * | 10/2002 | Ben-Yaakov .................. 363/44 |
| 6,980,445 | B2 | * | 12/2005 | Fukumoto et al. ............. 363/45 |
| 7,538,525 | B2 | * | 5/2009 | Kim et al. ...................... 323/205 |
| 7,683,595 | B2 | * | 3/2010 | Feldtkeller et al. ........... 323/282 |
| 8,143,866 | B2 |   | 3/2012 | Fagnani |
| 8,345,456 | B2 | * | 1/2013 | Nishikawa ...................... 363/89 |

* cited by examiner

*Primary Examiner* — Rajnikant Patel
(74) *Attorney, Agent, or Firm* — Michael C. Stephens, Jr.

(57) ABSTRACT

The present invention pertains to a boost power factor correction (PFC) controller. In one embodiment, a boost PFC controller for an AC/DC converter can include: an off signal generator that compares an inductor current sample signal against a first control signal, where the inductor current sample signal increases during an on time of a power switch of the AC/DC converter, and the off signal generator generates an off signal when the inductor current sample signal reaches the first control signal level; and an on signal generator that compares a second control signal against a third control signal, where the second control signal increases during the off time of the power switch, and the on signal generator generates an on signal when the second control signal reaches the third control signal level.

17 Claims, 5 Drawing Sheets

FIG. 1 (conventional)

BOOST PFC CONTROLLER

RELATED APPLICATIONS

This application claims the benefit of Chinese Patent Application No. 201210048426.5, filed on Feb. 29, 2012, which is incorporated herein by reference in its entirety.

FIELD OF THE INVENTION

The present invention generally pertains to power factor correction (PFC), and more specifically, pertains to a boost PFC controller.

BACKGROUND

Power factor correction (PFC) circuitry is typically added at an input side of a converter to decrease harmonic pollution to the power grid generated by power electric apparatuses. Active PFC may be utilized to increase the power factor of power electric apparatuses to decrease harmonic pollution because the input current can be regulated to be in phase with input voltage. Boost PFC topology is typically used to act as an active PFC circuit, which may become more attractive to high power applications in continuous conduction mode (CCM). A typical CCM boost PFC circuit will be described with reference to the example of FIG. 1.

Figure 1:
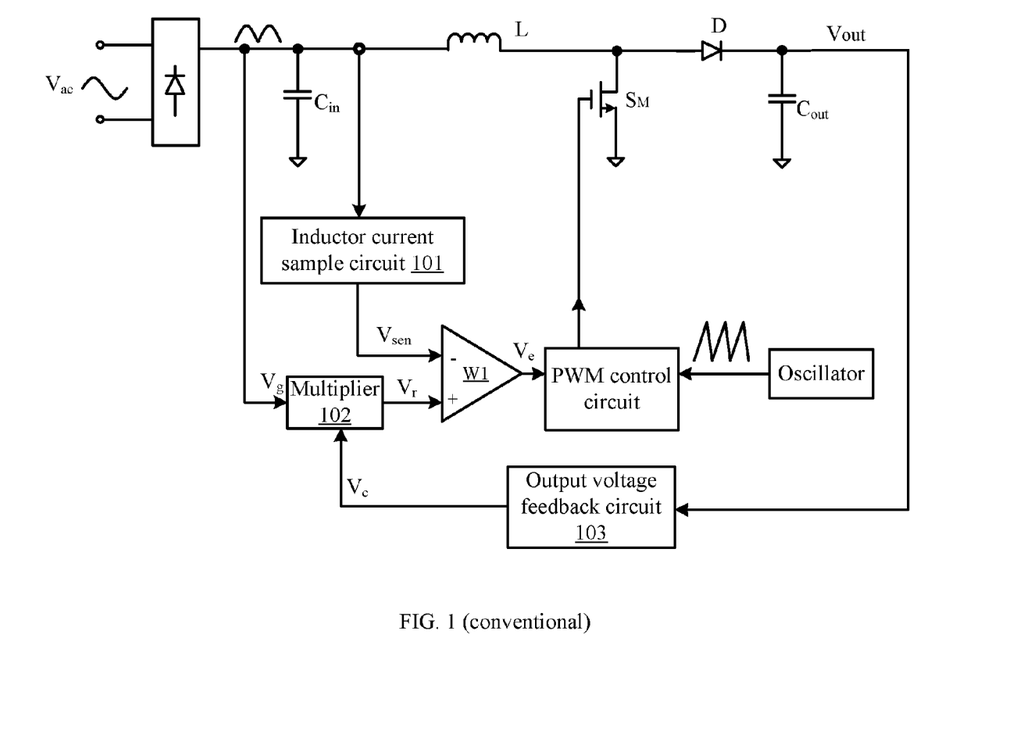
FIG. 1 shows a schematic diagram of a conventional CCM boost PFC controller.

In FIG. 1, shown is a schematic diagram of a conventional CCM boost PFC circuit including a power stage and a control circuit. The power stage can include inductor L, power switch $S_M$, diode D, input capacitor $C_{in}$, and output capacitor $C_{out}$, to form a boost topology. Average current control mode may be utilized by the control circuit that can include a current loop and a voltage loop. Inductor current can be detected by inductor current sensing circuit 101, and averaged to generate sensing voltage signal $V_{sen}$ representative of the average of the inductor current. Multiplier 102 can receive rectified input voltage $V_g$ and feedback signal $V_c$, generated by output voltage feedback circuit 103, to generate reference signal $V_r$. Error amplifier W1 may be used to calculate and amplify the error between reference signal $V_r$ and sensing voltage signal $V_{sen}$ to generate error signal $V_e$. The PWM control circuit may be used to generate a control signal for operation of power switch $S_M$ in based on error signal $V_e$ and a sawtooth signal, as shown. Input current may be regulated accordingly to maintain an input current waveform that follows the input voltage to achieve power factor correction.

For this conventional CCM boost PFC circuit, the switching frequency of power switch SM is constant as determined by an inner clock signal, such as the sawtooth signal generated by an oscillator. To achieve improved electromagnetic interference (EMI) performance, a frequency jitter technique may be used to isolate higher frequency range noise.

SUMMARY

In view of the above-mentioned, the object of the present invention is to provide a novel boost power factor correction (PFC) controller to achieve switching frequency that can be constant or variable, and that may not require such an inner clock signal.

In one embodiment, a boost PFC controller configured for an AC/DC converter can include: (i) an off signal generator configured to compare an inductor current sample signal against a first control signal, where the inductor current sample signal increases during an on time of a power switch of the AC/DC converter, and where the off signal generator is configured to generate an off signal when the inductor current sample signal reaches a level of the first control signal; (ii) an on signal generator configured to compare a second control signal having a first coefficient of proportionality to an off time of the power switch against a third control signal having a second coefficient of proportionality to an off duty cycle of the power switch, where the second control signal increases during the off time of the power switch, and where the on signal generator is configured to generate an on signal when the second control signal reaches a level of the third control signal; and (iii) a logic circuit coupled to the on signal generator and the off signal generator, where the logic circuit is configured to turn on the power switch when the on signal is active, and to turn off the power switch when the off signal is active.

Embodiments of the present invention can advantageously provide several advantages over conventional approaches. For example, the inner clock signal can be omitted in the control circuit, and the switching frequency can be constant or variable to facilitate design of an EMI filter. The output voltage feedback signal may also be dependent on the input power, not the rectified input voltage, which may be adaptive to different input voltages of a wide variety of global power grids. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Boost power factor correction (PFC) controllers in accordance with embodiments of the present invention can be applied in AC/DC converters that may include a standard power stage. Components with the same labels in different diagrams may have the same or similar functions. Also, particular embodiments may also be suitable to other types of converters, regulators, and/or power supply circuits.

In one embodiment, a boost PFC controller configured for an AC/DC converter can include: (i) an off signal generator configured to compare an inductor current sample signal against a first control signal, where the inductor current sample signal increases during an on time of a power switch of the AC/DC converter, and where the off signal generator is configured to generate an off signal when the inductor current sample signal reaches a level of the first control signal; (ii) an on signal generator configured to compare a second control signal having a first coefficient of proportionality to an off time of the power switch against a third control signal having a second coefficient of proportionality to an off duty cycle of the power switch, where the second control signal increases during the off time of the power switch, and where the on signal generator is configured to generate an on signal when the second control signal reaches a level of the third control signal; and (iii) a logic circuit coupled to the on signal generator and the off signal generator, where the logic circuit is configured to turn on the power switch when the on signal is active, and to turn off the power switch when the off signal is active.

Figure 2:
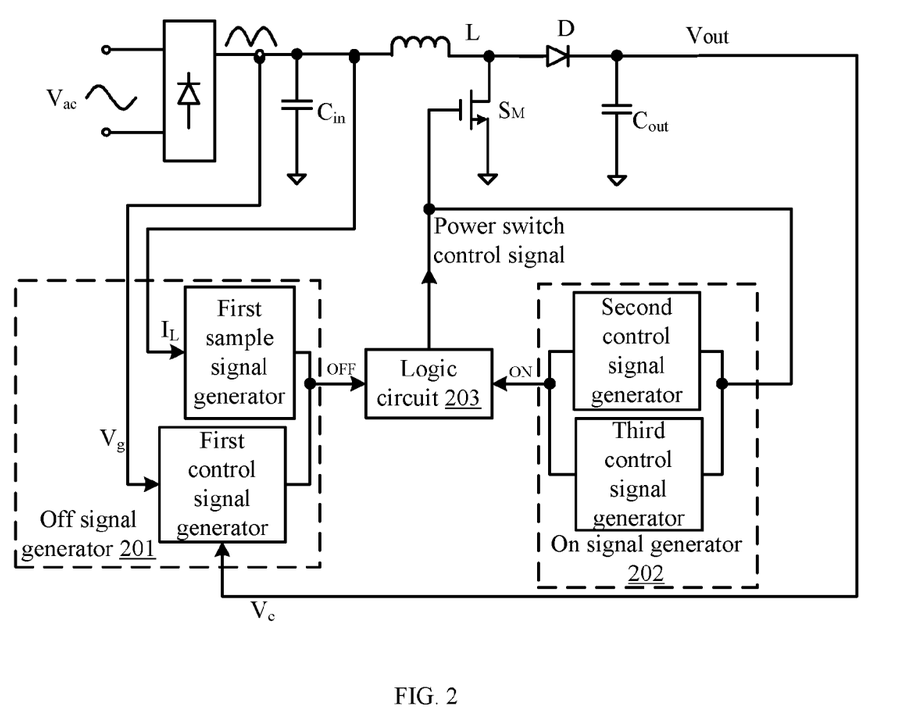
FIG. 2 shows a schematic diagram of an example of boost PFC controller in accordance with embodiments of the present invention.

Referring now to FIG. 2, shown is a schematic block diagram of a boost PFC controller in accordance embodiments of the present invention. This particular boost PFC controller can include "off" signal generator 201, "on" signal generator 202, and logic circuit 203. For example, off signal generator 201 may provide off control for the power switch control signal (e.g., activation of power switch $S_M$), and on signal generator 202 may provide on control for the power switch control signal (e.g., deactivation of power switch $S_M$). One switching period of the power switch can include on time $T_{ON}$ and off time $T_{OFF}$.

In off signal generator 201, a first control signal may be generated in accordance with rectified input voltage $V_g$ and a feedback signal representative of the output voltage Vout. Also, a first sample signal may be generated in accordance with inductor current $I_L$. For example, inductor current $I_L$ may continue to increase when power switch $S_M$ is turned on. Off signal generator 201 can receive the first sample signal and the first control signal. When the first sample signal reaches a level (e.g., a voltage level, a current level, etc.) of the first control signal, off signal OFF may be generated to ensure that inductor current is in direct proportion to rectified input voltage $V_g$.

On signal generator 202 can include a second control signal and a third control signal. The second control signal may be proportional to a turn-off time $T_{OFF}$ of power switch $S_M$, and the coefficient of which is a first coefficient. The third control signal may be proportional to a off duty cycle of power switch $S_M$, and the coefficient of which is second coefficient. When the second control signal reaches a level (e.g., a voltage level, a current level, etc.) of the third control signal, on signal ON can be generated to ensure that the switching period maintains a substantially constant value.

Logic circuit 203 may be coupled to on signal generator 202 and off signal generator 201 to control the operation of power switch $S_M$ in accordance with on signal ON and off signal OFF. For example, when on signal ON is active, power switch $S_M$ may be turned on or activated, and when off signal OFF is active, power switch $S_M$ may be turned off or deactivated.

From the foregoing descriptions, if the ratio of the first coefficient of proportionality and the second coefficient of proportionality is maintained as substantially constant, the switching period of the power switch may also thus be substantially constant. In contrast, the switching period of the power switch may be variable if the coefficient of proportionality ratio is adjustable. Also, during a single switching period, the on signal generator may be configured to control off-time of the power switch, while the off signal generator may be configured to control the on-time of the power switch.

In the particular example boost PFC controller shown in FIG. 2, the power switch can be operated in a fixed frequency mode or a jitter frequency mode to decrease design difficulties associated with an electromagnetic interference (EMI) filter, and without using an inner clock signal of the controller.

Figure 3:
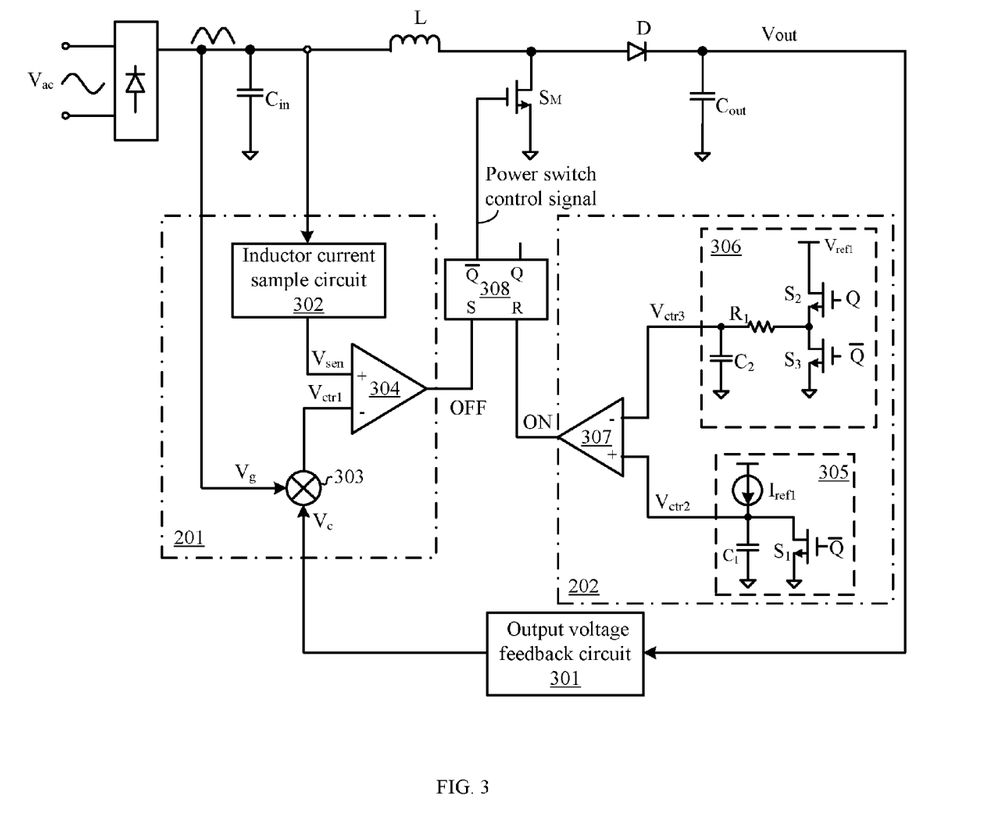
FIG. 3 shows a schematic diagram of a more detailed example of a boost PFC controller in accordance with embodiments of the present invention.

Referring now to FIG. 3, shown is a more detailed schematic diagram of a boost PFC controller in accordance with embodiments of the present invention. In particular, more details of examples of off signal generator 201, on signal generator 202, and logic circuit 203 are depicted. For example, logic circuit 203 can include RS flip-flop 308. Output voltage feedback circuit 301 may also be used to generate feedback signal $V_c$ representative of output voltage Vout of the AC/DC converter.

Off signal generator 201 can include inductor current sample circuit 302, multiplier 303, and comparator 304. Inductor current sample circuit 302 may be used to generate sample signal $V_{sen}$ representative of an average value of the inductor current. For example, an average value of the inductor current can be determined by averaging the sample signal of a sample resistor. Multiplier 303 can be used to multiply rectified input voltage $V_g$ and output voltage feedback signal $V_c$ to generate the first control signal $V_{ctrl}$, the value of which can be indicated as $V_{ctrl} = V_g V_c$.

Comparator 304 can be used to generate off signal OFF at an output terminal depending on first sample signal $V_{sen}$ at the non-inverting input terminal and first control signal $V_{ctrl}$ at the inverting terminal. On signal generator can include second control signal generator 305, third control signal generator 306, and comparator 307. Second control signal generator 305 can include current source $I_{ref1}$ and charging capacitor $C_1$ that can be coupled in series between a voltage source and ground. Also, switch $S_1$ can be coupled in parallel with charging capacitor $C_1$. Further, both switch $S_1$ and power switch $S_M$ can be controlled by the same power switch control signal as shown. The voltage at a common node of current source $I_{ref1}$ and charging capacitor $C_1$ may be configured as second control signal $V_{ctrl2}$.

Third control signal generator 306 can include an averaging circuit to receive voltage source $V_{ref1}$, and on signal and off control signals of the power switch, to generate third control signal $V_{ctrl3}$. The third control signal $V_{ctrl3}$ may be proportion with an off duty cycle of power switch $S_M$. Third control signal generator 306 can also include switches $S_2$ and $S_3$ coupled in series between voltage source $V_{ref1}$ and ground. Also, third control signal generator 306 can include a filtering circuit with resistor $R_1$ and capacitor $C_2$ coupled in series between a common node of switches $S_2$ and $S_3$ and ground.

Switches $S_2$ and $S_3$ may be controlled by opposite signals, one of which is in conformity with, or the same control signal as power switch $S_M$, while the other is the inverted version of that power switch control signal. In addition, the voltage of second capacitor $C_2$ may be configured as third control signal $V_{ctrl3}$. Comparator 307 may be used to generate on signal ON at and output terminal based on second control signal $V_{ctrl2}$ at its non-inverting terminal and third control signal $V_{ctrl3}$ at its inverting terminal.

The logic circuit 203 can include RS flip-flop 308, and the reset terminal may be coupled to on signal generator 201 to receive ON, and the set terminal can be coupled to off signal generator 202 to receive OFF. Also, an inverted output signal from RS flip-flop 308 can be coupled to the control terminal of power switch $S_M$ to control operation of power switch $S_M$. Example operation and principles of the boost PFC controller will be described in detail as below.

When power switch $S_M$ is off, switch $S_1$ and switch $S_3$ may be off, while switch $S_2$ can be on. Charging capacitor $C_1$ may be charged by current source $I_{ref1}$, and second control signal $V_{ctrl2}$ may increase, and the value of which can be determined as the following formula (1).

$$V_{ctr2} = T_{OFF} \times \frac{I_{ref1}}{C_1} \quad (1)$$

From formula (1), it can be concluded that a first coefficient of proportionality $K_1$ can be indicated as a ratio of the value of current source $I_{ref1}$ and the value of charging capacitor $C_1$, which can be formulated as in formula (2).

$$K_1 = \frac{I_{ref1}}{C_1} \quad (2)$$

Voltage source $V_{ref1}$ may be chopped or rectified by switches $S_2$ and $S_3$, and then averaged by the RC filtering circuit to generate third control signal $V_{ctrl3}$, which can be determined as below in formula (3).

$$V_{ctr3} = V_{ref1} \frac{T_{OFF}}{T_s} \quad (3)$$

Thus, third control signal $V_{ctrl3}$ may be in proportion with a ratio of off time $T_{OFF}$ and switching period $T_s$ of power switch $S_M$. Further, the second coefficient of proportionality $K_2$ of which may be the value of voltage source $V_{ref1}$.

When second control signal $V_{ctrl2}$ reaches a level of third control signal $V_{ctrl3}$ as indicated in the following formula (4), on signal ON may be generated at the output terminal of comparator 307 to reset RS flip flop 308. Then, the inverting output terminal is changed to a high level to turn on power switch $S_M$.

$$V_{ref1} \frac{T_{OFF}}{T_s} = T_{OFF} \frac{I_{ref1}}{C_1} \quad (4)$$

From formula (4), the switching period $T_s$ of power switch $S_M$ can be determined as formula (5):

$$T_s = \frac{V_{ref1} C_1}{I_{ref1}} \quad (5)$$

From formula (5), the switching period $T_s$ can be determined by a ratio of the second coefficient of proportionality and the first coefficient of proportionality. The switching period $T_s$ can be substantially constant or variable by adjusting the ratio of the second coefficient of proportionality and the first coefficient of proportionality. When voltage source $V_{ref1}$ is selected as a constant voltage source and current source $I_{ref1}$ is selected as a constant current source, the switching period $T_s$ of power switch $S_M$ may be fixed. Alternatively, when the voltage source $V_{ref1}$ or current source $I_{ref1}$ are adjustable, the switching period $T_s$ of power switch $S_M$ can be variable.

When power switch $S_M$ is on, both switch $S_1$ and switch $S_3$ may be on, while switch $S_2$ can be off. Also, capacitor $C_1$ may be discharged through switch $S_1$. Power switch $S_M$ may not be turned off until off signal OFF changes to a high level generated by off signal generator 201. Example operational waveforms illustrating these relationships are shown in FIG. 4.

Figure 4:
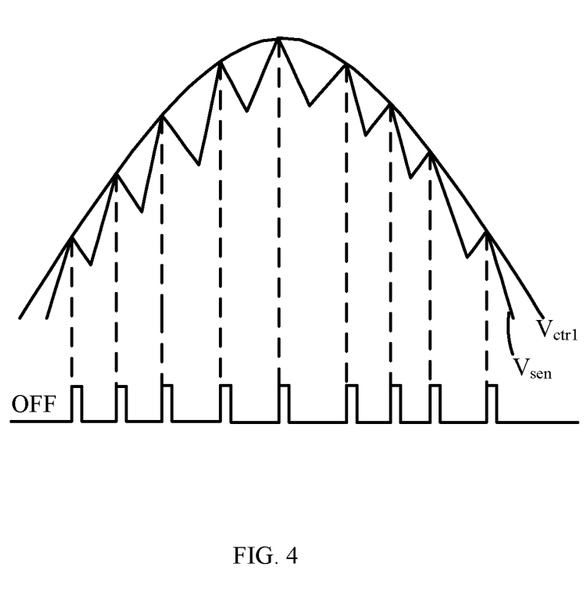
FIG. 4 shows the operation waveforms of the off signal generator of the example boost PFC controller illustrated in FIG. 3.

In FIG. 4, when power switch $S_M$ is on, sample signal $V_{sen}$ may continue to increase. When sample signal $V_{sen}$ reaches a level (e.g., a voltage level, a current level, etc.) of first control signal $V_{ctrl}$, off signal OFF may be generated by comparator 304. RS flip-flop 308 can be set by off signal OFF, and the inverted can be used to turn off power switch $S_M$.

A value of first sample signal $V_{sen}$ can be indicated as a product of a resistance of sample resistor $R_s$ and a value of inductor current $I_L$, $V_{sen} = I_L \times R_s$. First control signal $V_{ctrl}$ can be indicated as a product of rectified input voltage $V_g$ and feedback signal $V_c$, $V_{ctrl} = V_g \times V_c$. When first sample signal $V_{sen}$ reaches a level of first control signal $V_{ctrl}$, $V_{sen} = V_{ctrl}$, the following formula (6) can be indicated.

$$I_L = \frac{V_g V_c}{R_s} \quad (6)$$

When the boost PFC converter operates in continuous conduction mode (CCM), input impendence $Z_{in}$ can be calculated as shown below in formula (7).

$$Z_{in} = \frac{V_g}{I_L} \quad (7)$$

Thus, input impendence $Z_{in}$ can be indicated as below in formula (8).

$$Z_{in} = \frac{R_s}{V_c} \quad (8)$$

Because the transient response of the output voltage feedback circuit may be relatively low, feedback signal $V_C$ can be substantially constant during a power cycle, and input impendence $Z_{in}$ may be a substantially constant value. Power factor correction can be achieved to make the input current substantially in phase with the input voltage.

The average input power $P_{in}$ of the AC/DC converter of the particular example shown in FIG. 3 can be concluded from formula (9) as below.

$$P_{in} = \frac{V_g^2}{Z_{in}} = \frac{V_g^2 V_c}{R_s} \quad (9)$$

From formula (9), it can be seen that feedback signal $V_c$ may be dependent on input power $P_{in}$ and rectified input voltage $V_g$ even though power factor correction is achieved. In another example, a power forward circuit can be supplemented with the particular example of FIG. 3 to ensure that feedback signal $V_c$ may be determined only by input power $P_{in}$, and not necessarily by rectified input voltage $V_{in}$.

Figure 5:
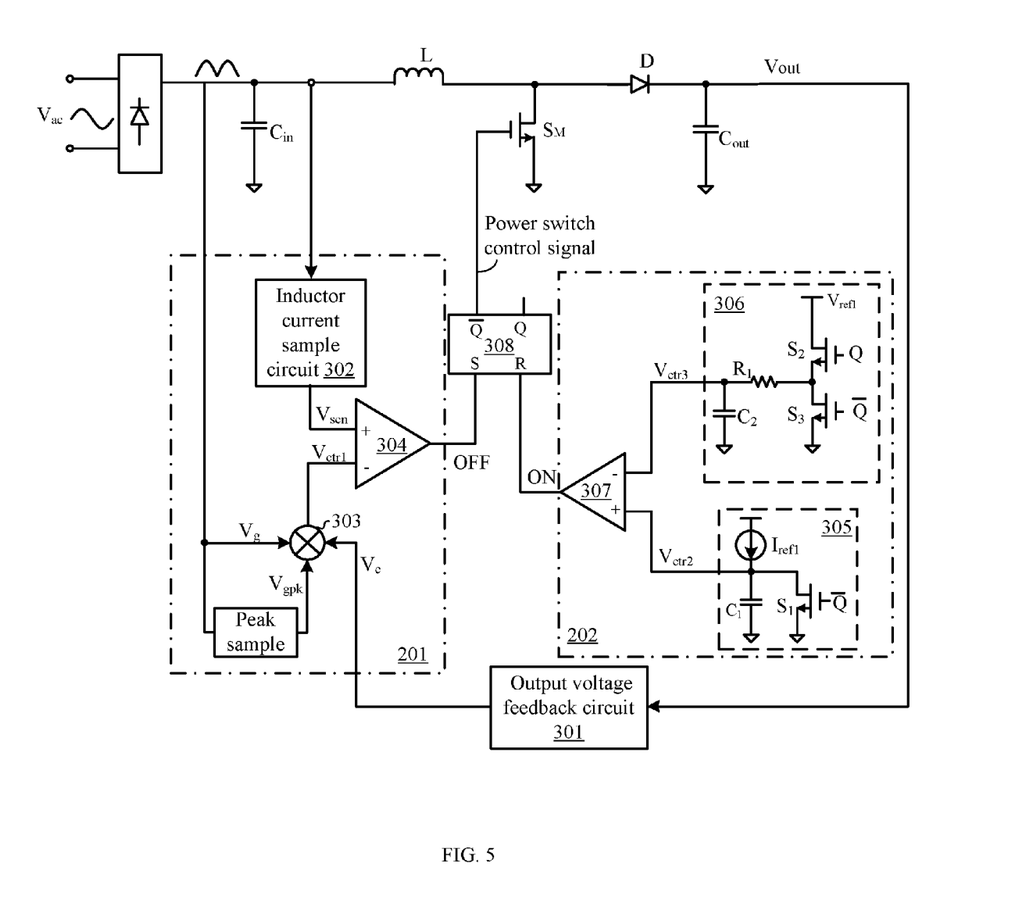
FIG. 5 shows a schematic diagram of another example of a boost PFC controller in accordance with embodiments of the present invention.

Referring now to FIG. 5, the example boost PFC controller of FIG. 3 can further include a power forward circuit configured to generate a peak voltage signal $V_{gpk}$ in accordance with rectified input voltage $V_g$. First control signal $V_{ctrl}$ can be indicated as below in formula (10).

$$V_{ctrl} = \frac{V_g V_c}{V_{gpk}^2} \tag{10}$$

When sample signal $V_{sen}$ reaches a level of first control signal $V_{ctrl}$, the following formula (11) can be indicated.

$$I_L = \frac{V_g V_c}{V_{gpk}^2 R_s} \tag{11}$$

Thus, input impendence $Z_{in}$ of the example boost PFC converter can be indicated as below in formula (12).

$$Z_{in} = \frac{V_g}{I_L} = \frac{V_{gpk}^2 R_s}{V_c} \tag{12}$$

Here, in view that the value of peak voltage signal $V_{gpk}$ may be a constant value for a certain power grid, and feedback signal $V_c$ can be maintained as substantially fixed during a power cycle, input impendence $Z_{in}$ may be a constant value. Thus, power factor correction can be achieved to ensure that the input current is in phase with the input voltage.

In addition, the average input power can be calculated as in formula (13) from formula (12), as shown below.

$$P_{in} = \frac{V_g^2}{Z_{in}} = \frac{V_g^2 V_c}{V_{gpk}^2 R_s} \tag{13}$$

Here, the ratio of $(V_g)^2$ and $(V_{pk})^2$ can be fixed for a certain power grid, so the input power may be proportional to feedback signal $V_c$. Also, feedback signal $V_c$ may be dependent only on input power $P_{in}$, and substantially independent of the rectified input voltage.

In this way, the switching frequency of the power switch can be controlled by a boost PFC controller without requiring a clock signal generated by an oscillator, and while achieving power factor correction. In addition, jitter frequency can be achieved by adjusting the values of a voltage or current source to disperse the harmonic interference, and to facilitate design of EMI filter as compared to conventional jitter frequency control approaches. Further, a boost PFC controller in particular embodiments can be applied to different input voltages of global power grids through an input voltage forward circuit because the output voltage feedback signal may be dependent only on the input power, and not the input voltage.

The foregoing descriptions of specific embodiments of the present invention have been presented through images and text for purpose of illustration and description of the boost PFC controller circuitry and methods of operation. They are not intended to be exhaustive or to limit the invention to the precise forms disclosed, and obviously many modifications and variations are possible in light of the above teaching, such as the variable number of the current mirror and the alternatives of the type of the power switch for different applications.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A boost power factor correction (PFC) controller configured for an AC/DC converter, the boost PFC controller comprising:
   a) an off signal generator configured to compare an inductor current sample signal against a first control signal, wherein said inductor current sample signal increases during an on time of a power switch of said AC/DC converter, and wherein said off signal generator is configured to generate an off signal when said inductor current sample signal reaches a level of said first control signal;
   b) an on signal generator configured to compare a peak value of a second control signal having a first coefficient of proportionality to an off time of said power switch against a third control signal having a second coefficient of proportionality to an off duty cycle of said power switch, wherein said second control signal increases during said off time of said power switch, and wherein said on signal generator is configured to generate an on signal when said second control signal reaches a level of said third control signal; and
   c) a logic circuit coupled to said on signal generator and said off signal generator, wherein said logic circuit is configured to turn on said power switch when said on signal is active, and to turn off said power switch when said off signal is active, wherein each of said second and third control signals is generated using an output of said logic circuit that is used to control said power switch.

2. The boost PFC controller of claim 1, wherein a ratio of said first coefficient of proportionality to said second coefficient of proportionality is substantially constant to maintain a switching period of said power switch as substantially constant.

3. The boost PFC controller of claim 1, wherein a ratio of said first coefficient of proportionality to said second coefficient of proportionality is adjustable to control a switching period of said power switch as variable.

4. The boost PFC controller of claim 1, wherein said first control signal is controlled by a rectified input voltage that is generated by rectifying an AC input voltage and a feedback signal that represents an output voltage of said AC/DC converter.

5. The boost PFC controller of claim 4, further comprising an output voltage feedback circuit configured to generate said feedback signal, and to control said first control signal to maintain said output voltage as substantially constant.

6. The boost PFC controller of claim 4, further comprising a power forward circuit configured to detect a peak value of said rectified input voltage to generate a peak voltage signal, wherein said first control signal is configured to be generated by a ratio of a product of said rectified input voltage and said feedback signal and a square of said peak voltage signal such that said feedback signal is in proportion to an input power of said AC/DC converter.

7. The boost PFC controller of claim 4, wherein said off signal generator comprises:
   a) an inductor current sample circuit configured to sample an inductor current of said AC/DC converter to generate said inductor current sample signal;

b) a multiplier configured to multiply said rectified input voltage and said feedback signal to generate said first control signal; and c) a first compare circuit configured to receive said first control signal and said inductor current sample signal, wherein said first sample signal increases when said power switch is on, and wherein said first compare circuit is configured to generate said off signal when said inductor current sample signal reaches a level of said first control signal.

8. The boost PFC controller of claim 1, wherein said on signal generator comprises:

a) a second control signal generator having a first current source, a first charging capacitor, and a first switch, wherein said first switch is controlled by a same signal as said power switch, wherein said first current source and said first charging capacitor are coupled in series between a first voltage source and ground, and said first switch is coupled in parallel with said first charging capacitor, wherein a voltage of said first charging capacitor is configured as said second control signal, and wherein a ratio of a value of said first current source and a value of said first charging capacitor is configured as said first coefficient of proportionality;

b) a third control signal generator having an averaging circuit configured to generate said third control signal in proportion to said first voltage source and said off duty cycle of said power switch, wherein a value of said first voltage source is configured as said second coefficient of proportionality; and c) a second compare circuit configured to compare said second control signal and said third control signal, wherein said second compare circuit is configured to generate said on signal when said second control signal reaches a level of said third control signal when said first switch is on.

9. The boost PFC controller of claim 8, wherein said first voltage source is a substantially constant voltage source and said first current source is a substantially constant current source to maintain a switching period of said power switch as substantially constant.

10. The boost PFC controller of claim 8, wherein at least one of said first voltage source and said first current source is adjustable to control a switching period of said power switch as variable.

11. The boost PFC controller of claim 1, wherein said logic circuit comprises an RS flip-flop, wherein a reset terminal of said RS flip-flop is coupled to said on signal generator, wherein a set terminal of said RS flip-flop is coupled to said off signal generator, and wherein an output of said RS flip-flop is configured to control said power switch.

12. The boost PFC controller of claim 11, wherein said output of said RS flip-flop to control said power switch comprises a complementary output.

13. The boost PFC controller of claim 1, wherein said inductor current sample signal is generated by an inductor current sample circuit coupled to a first terminal of an inductor in said AC/DC converter.

14. The boost PFC controller of claim 13, wherein said power switch is connected between a second terminal of said inductor and ground.

15. The boost PFC controller of claim 4, wherein said first control signal is in direct proportion with a product of said rectified input voltage and said feedback signal.

16. The boost PFC controller of claim 1, wherein said second control signal is configured as a ramp signal.

17. The boost PFC controller of claim 16, wherein a slope of said ramp signal is consistent with said first coefficient of proportionality.

* * * * *